(No Model.)
J. W. MUDD.
INSECT POWDER DUSTER.
No. 419,343. Patented Jan. 14, 1890.
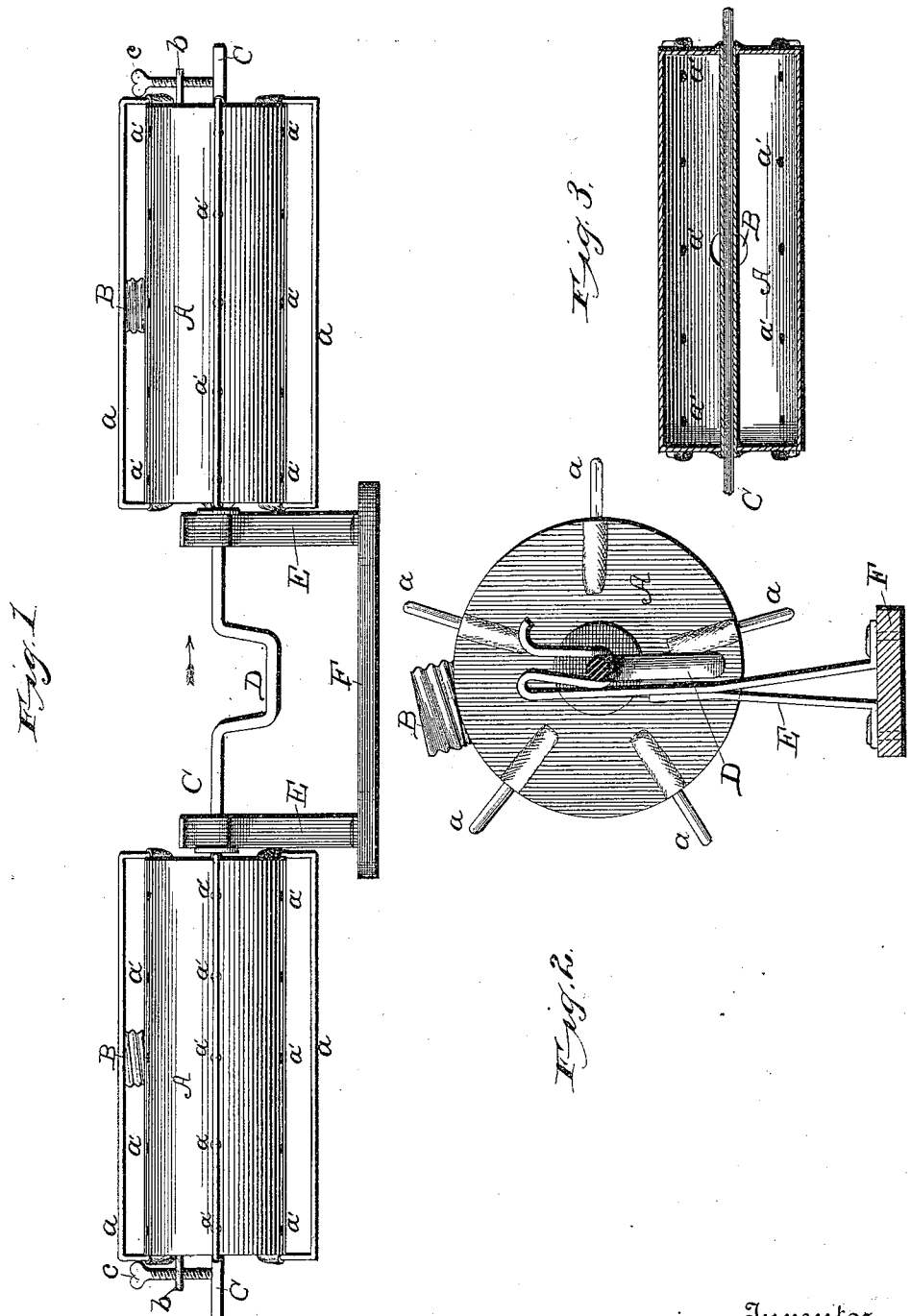
Witnesses
Geo. J. Thorpe
L. P. Whitaker
Inventor
John W. Mudd
By his Attorneys
Geo. Bancroft & Co.

UNITED STATES PATENT OFFICE.

JOHN W. MUDD, OF VICKSBURG, MISSISSIPPI.

INSECT-POWDER DUSTER.

SPECIFICATION forming part of Letters Patent No. 419,343, dated January 14, 1890.

Application filed September 17, 1889. Serial No. 324,244. (No model.)

*To all whom it may concern:*

Be it known that I, JOHN W. MUDD, a citizen of the United States, residing at Vicksburg, in the county of Warren and State of Mississippi, have invented certain new and useful Improvements in Machines for Applying Paris-Green to Cotton-Plants; and I do hereby declare the following to be a full, clear, and exact description of the invention, such as will enable others skilled in the art to which it appertains to make and use the same.

My invention relates to sprinkling-machines, and has for its special object the production of a device suitable for handling paris-green and sprinkling the same upon cotton-plants for the purpose of destroying insects with great facility and the least possible risk to the person using the poison.

The invention will be hereinafter described, and particularly pointed out in the claims.

In the accompanying drawings, which form part of this specification, Figure 1 represents a front elevation of my invention; Fig. 2, a cross-sectional view of same, looking in the direction of the arrow shown in Fig. 1; and Fig. 3, a longitudinal section through one cylinder.

Reference being had to the drawings and the letters thereon, A indicates two cylinders similar in form, preferably made of tin or other sheet metal, and punctured by a series of apertures $a'$, each running in a straight line from end to end of the cylinders and protected by wire guards $a$ directly opposite them, the function of which will be hereinafter described. These cylinders are further provided with a screw-cap B, covering an opening through which they are filled, and on the outer head of each is secured a lug $b$, carrying a thumb-screw $c$, intended to operate upon the surface of a shaft with which the cylinders revolve to lock them on said shaft, or, if desired, they may be permanently secured to the shaft by solder or otherwise, while through the center of each cylinder runs a tube which is open at both ends and affords a continuous bearing for the shaft C, on either end of which they will revolve freely until locked thereon by thumb-screws $c$.

Shaft C is bent at its center so as to form a double crank D, to serve as a means of revolving it, and is journaled on both sides thereof in supports E, secured to a base-board F. These supports E may be made of spring-metal in the form shown in Fig. 2, so that when the shaft is once seated in its bearings the spring of the metal will partially close the top of the supports, thus preventing an accidental displacement of the shaft. Rigidly secured to the shaft C at points just outside of the supports E are two collars which prevent any lateral movement of the shaft.

The several parts being substantially as described the operation is as follows: Base-board F having been secured to a horse, a wagon, or the body of a man, and the cylinders A having been partially filled with paris-green or other insect-destroying agent, the machine is advanced over the rows of cotton or other plants to be sprinkled and the cylinders revolved through the medium of crank D, the effect of which is to sprinkle the paris-green from each series of holes in turn as they reach the lowest point in the revolution of the cylinders, and the powder falling comes in contact with the guards $a$, which assist somewhat in spreading it in its descent upon the plants. The guards $a$ also perform another important function—namely, they prevent the leaves of plants which are being operated upon from coming in contact with the apertures $a'$ and thus interfering with a free sprinkling of the powder. The cylinders A being mounted loosely on shaft C, it is obvious that until they are locked thereon by the pressure of screws $c$ upon the shaft they may be moved laterally one way or the other, for the purpose of reaching two rows of plants that may be slightly farther apart than usual.

If it is desired, a rod may be swiveled to the lowest extremity of crank D, for the purpose of operating same; or if same is turned directly by the hand of the operator a spool may be loosely secured thereon to prevent friction on the palm of the hand.

Having thus described my invention, what I claim is—

1. In a sprinkling-machine, a cylinder provided with a filling-aperture and a series of perforations protected by a series of longitudinal guards secured to the cylinder, in combination with an axle with which it revolves, substantially as described.

2. In a sprinkling-machine, a cylinder provided with an inlet and a series of perforations and having a series of longitudinal guards secured to the cylinder opposite said perforations, in combination with an axle with which it revolves, substantially as described.

3. In a sprinkling-machine, the combination of a pair of cylinders each having filling-apertures, perforations in their surfaces protected by longitudinal guards secured to the cylinders, continuous tubular bearings through the center of each, an axle on which said cylinders are mounted, means for securing the cylinders to the axle, and supports for the latter, substantially as described.

In testimony whereof I affix my signature in presence of two witnesses.

JOHN W. MUDD.

Witnesses:
D. CAMPBELL,
L. P. DRAKE.